Dec. 10, 1968    A. B. BOWER, JR    3,415,332

DRILL BIT

Filed March 8, 1967

INVENTOR
ARNOLD B. BOWER, JR.
BY Harold J. Holt
ATTORNEY 3,415,332
DRILL BIT
Arnold B. Bower, Jr., St. Clair Shores, Mich., assignor to General Electric Company, a corporation of New York
Filed Mar. 8, 1967, Ser. No. 621,618
5 Claims. (Cl. 175—410)

ABSTRACT OF THE DISCLOSURE

A drill bit, useful in drilling mine roof bolt holes, formed of a hollow tube having an open end upon which is provided a diametrically transverse socket formed by a pair of spaced-apart plates secured to the end of the tube, and a removable cutter insert arranged within the socket, that is, between the plates, with the tube end being otherwise open for the flow of fluid, such as air and coolant liquids.

Background of the invention

This invention relates to a rotary drill bit useful in mining.

In drilling small holes in rock and the like, as for example drilling blasting holes or mine roof bolt installation holes, it is necessary to remove the cuttings or the dust generated during drilling. This has been accomplished either by applying a partial vacuum to the drill apparatus or by circulating coolant fluid around the drill so that the fluid, e.g. air or liquid, carries away the dust.

Conventional drill bits generally comprise a drill bit head, upon which a cutting edge is secured, with the bit heads being fastened to tubular drill shanks to which the rotational drilling power is applied. Such drill bit heads have been relatively large and complexly formed so that they obstructed and prevented the application of dust-removal fluid or coolants close to the actual cutting edge. This results in slower drilling and greater wear upon the cutting edge of the drill itself.

Summary of the invention

The present invention provides a drill bit which is so formed as to locate the cutting edge closely adjacent to the dust collecting fluid openings for efficient and immediate dust removal as well as for better application of coolant liquid, when used. The invention provides a cutting edge holder in the form of a simplified socket formed directly upon the open end of a tubular drill shank, for removably mounting a disposable cutting edge, thereby eliminating the drill bit head altogether, and with the drill shank conveying fluid and dust.

Brief description of the drawings

These and other objects and advantages of this invention will become apparent upon reading the following description, of which the attached drawings form a part.
In these drawings.

Description of the preferred embodiment

Figure 4:
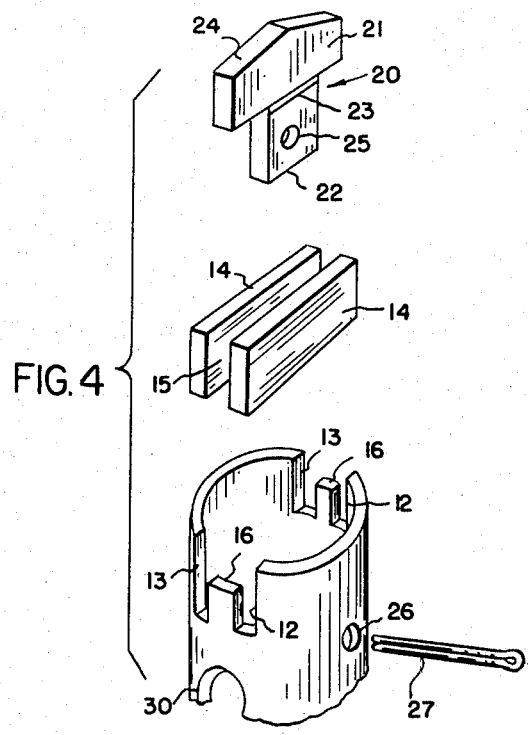
FIGURE 4 is a perspective, exploded view of the drill bit parts.
Figure 5:
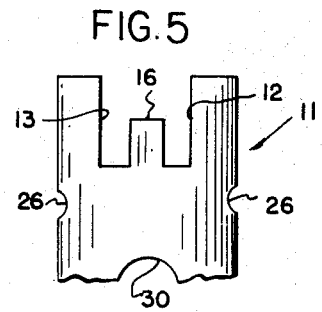
FIGURE 5 is an elevational view of the end portion of the drill shank.

The drill bit 10 is formed of a tubular shank or holder 11, preferably made of a suitable seamless steel tubing. As shown in FIG. 5, the shank or tubular holder is provided at its upper, open end with two pairs of transversely aligned slots 12 and 13, within which a pair of flat, narrow, elongated plates 14 (FIG. 4) are mounted. The plates are aligned parallel to and spaced upon opposite sides of a diametrical, axial plane of the tube so that the space therebetween forms a socket 15. The edges of the tube between the plates, that is, within the socket, are cut away to form shoulders 16.

While the plates may be made of any suitable material, it is preferred that they be made of a hard, wear-resistant material, such as tungsten carbide or the like.

Figure 1:
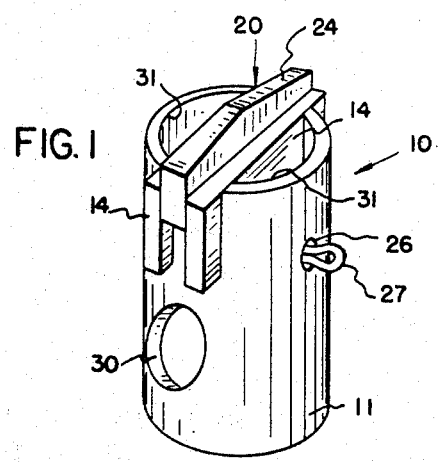
FIGURE 1 is a perspective view of the drill bit.
Figure 2:
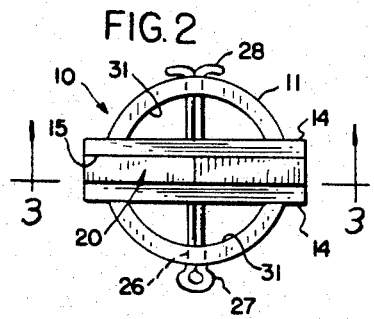
FIGURE 2 is a top, plan view of the bit.
Figure 3:
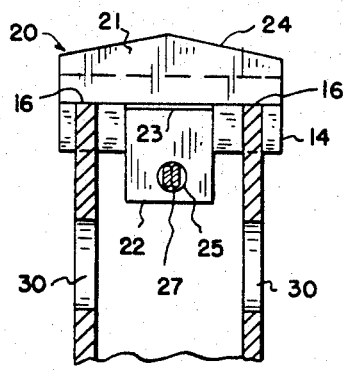
FIGURE 3 is a cross-sectional elevational view taken in the direction of arrows 3—3 of FIG. 2.

The plates are secured within their sockets so that their opposite ends extend slightly outwardly of the tube (see FIGS. 2 and 3). They may be permanently attached by means of brazing or welding or other suitable permanent fastening means.

Removably fitted within the socket 15 is a flat, T-shaped cutter bit insert 20 formed of a head 21 and a base 22. Preferably, the head is made of tungsten carbide or equivalent hard, wear-resistant material, and the base may be formed of suitable steel welded or brazed at 23 to the head, or alternatively may be made in one piece with the head, and out of the same material. The upper edge of the head forms the cutting edge 24.

An opening 25 is formed through the base 22 for alignment with opposed openings 26 formed in the end of the tubular shank so that a suitable pin, such as a cotter pin 27, may be inserted through the aligned openings 25 and 26 and secured therein as by bending the ends 28 over (see FIG. 2) to thereby removably fasten the cutter bit insert within the socket.

The cutter bit insert is approximately of the same thickness as the socket 15, so that it snugly fits between the two plates 14 in face-to-face contact therewith. In addition, the insert is wider than the diameter of the tube so that its lower opposite edges rest upon the shoulders 16, thereby positioning only a small portion of the outer edge of the insert above or outwardly of the end of the tube.

The tubular shank is also provided with a pair of enlarged holes 30, inwardly of its end, and further, its end is open and unobstructed at 31, in the areas not covered by the plates 14 and the insert 20.

The tube 11 may be of a relatively short length for coupling upon the end of a drill power unit shaft, or alternatively may be of a much greater length to form the drive shaft itself upon which is coupled a suitable power unit.

In operation, an insert 20 is inserted within the socket 15 and pinned in place. Thereafter, the drill is operated against rock, such as in the roof of a mine, and simultaneously either a vacuum is applied to the lower end of the tubular shank 11 for sucking air with the drill dust into the shank through the open upper end 31 and through the openings 30 in the shank, or alternatively, coolant fluid is flowed either inwardly through the shank and out through the open upper end 31 and openings 30 or reversely, as may be required for the particular drilling job. In this manner, either by using the air sucked into the tube or by using the coolant fluid, the dust and cuttings of drillings are rapidly removed at a location immediately adjacent the cutting edge 24, thereby permitting faster and more efficient operation of the drill.

I claim:
1. A drill bit comprising a hollow, metal tube having an open end;
  a pair of parallel, spaced-apart plates arranged transversely of the tube in planes parallel to and on opposite sides of a plane containing the tube axis, the plates being secured to the tube at its open upper end, with the space between the plates forming a central, diametrical transverse socket;
  a removable, flat cutter insert snugly fitted into said socket and extending the full diameter of said tube, with its opposite faces in face-to-face contact with the adjacent plates, and with one edge of the insert abutted against the end portions of the tube located between the plates, and the opposite edge of the insert extending axially outwardly of the tube end and the plates to form a cutting edge; and releasable means for removably fastening the cutter insert within said socket.

2. A drill bit as defined in claim 1, said insert being T-shaped, with the head of the T arranged in the socket and the base of the T extending through the socket inwardly of the tube, aligned openings formed in the tube wall and base of the T inwardly of the socket, and a removable fastening pin extending through said aligned openings for removably fastening the insert within the socket.

3. A drill bit as defined in claim 2, the head of the T being formed of a hard, wear-resistant carbide material, with the base of the T being formed of steel and being permanently secured to said head.

4. A drill bit as defined in claim 1, including two pairs of opposed slots formed in the end of the tube, with each plate being closely fitted into and fastened within one pair of slots, and with the end of the tube being otherwise open and unobstructed for fluid flow around the outer faces of the plates.

5. A drill bit as defined in claim 4, with the tube end portions located between the plates being axially inwardly cut away less than the height of the insert to form a pair of opposite depressed shoulders for the insert and against which the insert abuts, wherein a portion of the insert is axially inward of the tube end and a portion of the insert extends axially outwardly of the tube end.

References Cited

UNITED STATES PATENTS

| | | | |
|---|---|---|---|
| 1,978,006 | 10/1934 | Wright | 175—412 X |
| 2,169,283 | 8/1939 | Pippin | 175—260 |
| 2,575,239 | 11/1951 | Stevens | 175—418 X |
| 2,673,714 | 3/1954 | Hargrave | 175—410 |
| 2,673,717 | 3/1954 | Bacon | 175—404 X |
| 3,144,912 | 9/1964 | Boehm et al. | 175—419 X |
| 3,190,380 | 6/1965 | Anderson | 175—410 |

FOREIGN PATENTS 18,443   8/1912   Great Britain.

CHARLES E. O'CONNELL, *Primary Examiner.*

RICHARD E. FAVREAU, *Assistant Examiner.*

U.S. Cl. X.R.

175—418